(12) United States Patent
Masuzawa

(10) Patent No.: US 12,379,568 B2
(45) Date of Patent: Aug. 5, 2025

(54) PROJECTION LENS AND PROJECTION DEVICE

(71) Applicant: FUJIFILM Corporation, Tokyo (JP)

(72) Inventor: Tomonari Masuzawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 574 days.

(21) Appl. No.: 17/704,397

(22) Filed: Mar. 25, 2022

(65) Prior Publication Data

US 2022/0214519 A1 Jul. 7, 2022

Related U.S. Application Data

(63) Continuation of application No. PCT/JP2020/016199, filed on Apr. 10, 2020.

(30) Foreign Application Priority Data

Sep. 30, 2019 (JP) .................................. 2019-180564

(51) Int. Cl.
*G02B 7/02* (2021.01)
*G02B 13/16* (2006.01)
(Continued)

(52) U.S. Cl.
CPC ............. *G02B 7/028* (2013.01); *G02B 13/16* (2013.01); *G02B 13/18* (2013.01); *B60K 35/00* (2013.01);
(Continued)

(58) Field of Classification Search
CPC ........ G02B 7/028; G02B 13/16; G02B 13/18; G02B 27/0101; G02B 7/022;
(Continued)

(56) References Cited

U.S. PATENT DOCUMENTS 5,608,579 A 3/1997 Nomura
2002/0101668 A1* 8/2002 Fulkerson .............. G02B 13/16
359/819

(Continued)

FOREIGN PATENT DOCUMENTS

CN 1455878 A 11/2003
CN 102227663 A 10/2011
(Continued)

OTHER PUBLICATIONS

International Preliminary Report on Patentability and Written Opinion of the International Searching Authority (Forms PCT/IB/326, PCT/IB/373, and PCT/ISA/237) for International Application No. PCT/JP2020/016199, dated Apr. 14, 2022, with an English translation.

(Continued)

*Primary Examiner* — Magda Cruz
(74) *Attorney, Agent, or Firm* — Birch, Stewart, Kolasch & Birch, LLP

(57) ABSTRACT

A projection lens includes a lens that is made of a resin, a first holding frame that holds the lens, and a second holding frame that is not in contact with the lens and holds the first holding frame; and a thermal expansion coefficient of the first holding frame is higher than a thermal expansion coefficient of the second holding frame.

16 Claims, 12 Drawing Sheets

(51) Int. Cl.
*G02B 13/18* (2006.01)
*B60K 35/00* (2024.01)
*B60K 35/23* (2024.01)
*G02B 27/01* (2006.01)

(52) U.S. Cl.
CPC .......... *B60K 35/23* (2024.01); *B60K 2360/29* (2024.01); *B60K 2360/40* (2024.01); *G02B 27/0101* (2013.01)

(58) Field of Classification Search
CPC ............ G02B 2027/0145; B60K 35/00; B60K 35/23; B60K 2360/29; B60K 2360/40; B60K 2360/334; B60K 2360/688; G03B 21/00; G03B 21/14
USPC .......................................................... 353/100
See application file for complete search history.

(56) References Cited

U.S. PATENT DOCUMENTS

| | | | | |
|---|---|---|---|---|
| 2011/0038065 | A1* | 2/2011 | Miyawaki | G02B 13/0035 228/121 |
| 2012/0019905 | A1* | 1/2012 | Teraoka | G02B 7/021 359/356 |
| 2021/0373299 | A1* | 12/2021 | Kayano | G03B 21/28 |

FOREIGN PATENT DOCUMENTS

| | | | | |
|---|---|---|---|---|
| CN | 109725398 A | | 5/2019 | |
| JP | 61-2112 A | | 1/1986 | |
| JP | 7-272645 A | | 10/1995 | |
| JP | 08220409 A | * | 8/1996 | ............... G02B 7/02 |
| JP | 2011145323 A | * | 7/2011 | ............... G02B 7/02 |
| JP | 2011-157821 A | | 8/2011 | |
| JP | 2012-118404 A | | 6/2012 | |
| JP | 2015169916 A | * | 9/2015 | ............... G02B 7/02 |
| JP | 2019-2969 A | | 1/2019 | |

OTHER PUBLICATIONS

International Search Report (Form PCT/ISA/210) for International Application No. PCT/JP2020/016199, dated Jun. 30, 2020, with an English translation.
Chinese Office Action and Search Report for corresponding Chinese Application No. 202080068080.8, dated Aug. 19, 2023, with a partial English translation.
Japanese Notice of Reasons for Refusal for corresponding Japanese Application No. 2021-551120, dated Dec. 13, 2022, with an English translation.

* cited by examiner

FIG. 5

| MEMBER | MATERIAL | THERMAL EXPANSION COEFFICIENT IN RADIAL DIRECTION | THERMAL EXPANSION COEFFICIENT IN DIRECTION OF OPTICAL AXIS |
|---|---|---|---|
| CORRECTION LENS | RESIN | 60 | 60 |
| CORRECTION LENS-HOLDING FRAME | FIBER-REINFORCED RESIN | 40 | 20 |
| HOLDING FRAME FOR HOLDING CORRECTION LENS-HOLDING FRAME | METAL | 23 | 23 |

※ UNIT OF THERMAL EXPANSION COEFFICIENT IS $10^{-6}/K$

PROJECTION LENS AND PROJECTION DEVICE

CROSS-REFERENCE TO RELATED APPLICATIONS

This application is a continuation application of International Application No. PCT/JP2020/016199 filed on Apr. 10, 2020, the disclosure of which is incorporated herein by reference in its entirety. Further, this application claims priority from Japanese Patent Application No. 2019-180564 filed on Sep. 30, 2019, the disclosure of which is incorporated herein by reference in its entirety.

BACKGROUND

1. Technical Field

The technique of the present disclosure relates to a projection lens and a projection device.

2. Description of the Related Art

A projection optical device disclosed in JP2019-002969A comprises a first optical system that forms an intermediate image, a second optical system that enlarges the intermediate image, a first mirror that is disposed on an optical path in the first optical system, a second mirror that is disposed between the first optical system and the second optical system, a first holding member that holds the first optical system and the first mirror, and a second holding member that holds the second optical system and the second mirror.

In JP2019-002969A, the first optical system comprises a first lens group that is disposed on the incident side of the first mirror, a first lens barrel that houses the first lens group and is held by the first holding member, a second lens group that is disposed on the emission side of the first mirror, and a second lens barrel which houses the second lens group and of which at least a part is disposed in the first holding member. Further, the second optical system comprises a third lens group that is disposed along the optical axis of the second optical system and a third lens barrel that houses the third lens group and is held by the second holding member. The first holding member and the second holding member are connected to the second optical system.

SUMMARY

An embodiment according to the technique of the present disclosure provides a projection lens and a projection device that can maintain the performance of a lens made of a resin.

A projection lens according to an aspect of the present disclosure comprises a lens that is made of a resin, a first holding frame that holds the lens, and a second holding frame that is not in contact with the lens and holds the first holding frame, and a thermal expansion coefficient of the first holding frame is higher than a thermal expansion coefficient of the second holding frame.

It is preferable that the first holding frame includes a holding portion that holds the lens and a connecting portion that is connected to the second holding frame.

It is preferable that the first holding frame and the second holding frame are connected to each other through the connecting portion in a state where the first holding frame is disposed on an outside and the second holding frame is disposed on an inside in a radial direction of the lens.

It is preferable that the first holding frame and the second holding frame are connected to each other through the connecting portion in a state where the first holding frame is disposed on an inside and the second holding frame is disposed on an outside in a radial direction of the lens, and a gap is provided between the first holding frame and the second holding frame.

It is preferable that the holding portion includes a first extending portion that extends in a radial direction of the lens and a second extending portion that extends in a direction of an optical axis of the lens.

It is preferable that the first extending portion includes a first contact portion that is in contact with an emission-side surface of the lens.

It is preferable that the first extending portion further includes a second contact portion that is in contact with an incident-side surface of the lens.

It is preferable that a length of the second contact portion in the radial direction is longer than a length of the first contact portion in the radial direction.

It is preferable that the second extending portion is in contact with an edge surface of the lens.

It is preferable that the connecting portion includes a third extending portion that extends in a radial direction of the lens and a fourth extending portion that extends in a direction of an optical axis of the lens.

It is preferable that the first holding frame includes a facing portion that faces a part of an outer edge portion of the lens and a gap is provided between the facing portion and the part of the outer edge portion of the lens.

It is preferable that the outer edge portion of the lens is formed of a linear outer edge portion that is a portion extending linearly and an arcuate outer edge portion that is the other portion, and the holding portion holds the arcuate outer edge portion and the gap is provided between the facing portion and the linear outer edge portion.

It is preferable that a thermal expansion coefficient of the lens is higher than the thermal expansion coefficient of the first holding frame.

It is preferable that a distal end of the first holding frame, which holds the lens, has a tapered shape.

It is preferable that the lens is an aspherical lens that includes an aspheric surface among lens surfaces.

It is preferable that the lens is an emission lens disposed closest to an emission side. Further, it is preferable that the lens is an intermediate lens disposed between an incident end portion and an emission end portion.

It is preferable that the first holding frame is made of a fiber-reinforced resin and the second holding frame is made of metal.

It is preferable that the projection lens is for transportation equipment.

A projection device according to another aspect of the present disclosure comprises the projection lens according to any one of the aspects and an image forming unit that forms an image to be projected on a screen through the projection lens.

BRIEF DESCRIPTION OF THE DRAWINGS

Exemplary embodiments according to the technique of the present disclosure will be described in detail based on the following figures, wherein:

FIG. 5 is a table showing the materials and thermal expansion coefficients of a correction lens, the correction lens-holding frame, and a holding frame for holding the correction lens-holding frame;

DETAILED DESCRIPTION

An example of an embodiment of a technique of the present disclosure will be described below with reference to the drawings. Terms, such as "first", "second", and "third", used in this specification are added to avoid the confusion of components and do not limit the number of components present in a projection lens or a projection device.

Figure 1:
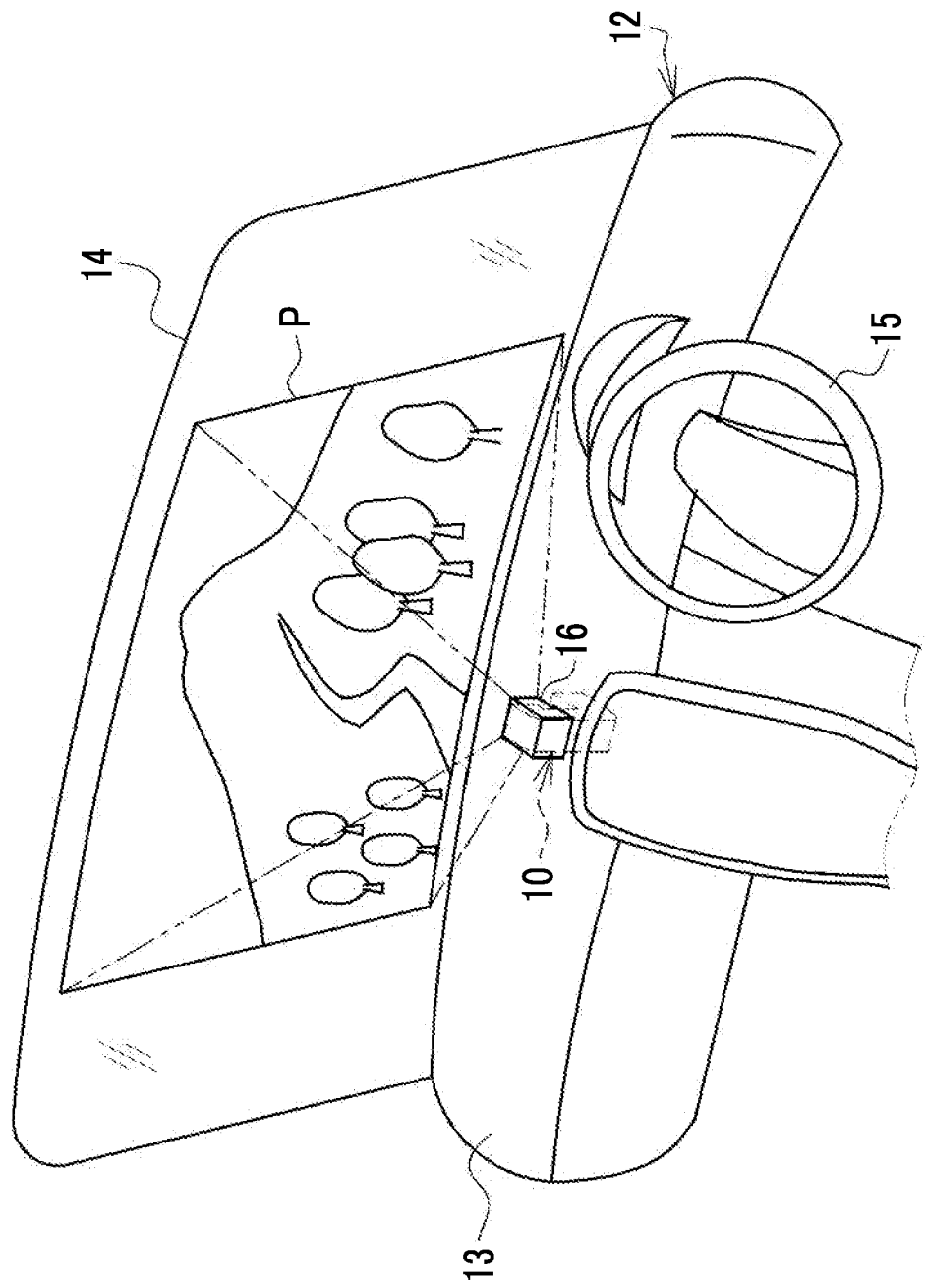
FIG. 1 is a diagram showing an aspect in which an image is projected on a windshield from a projection lens built in a dashboard of an automobile.
Figure 2:
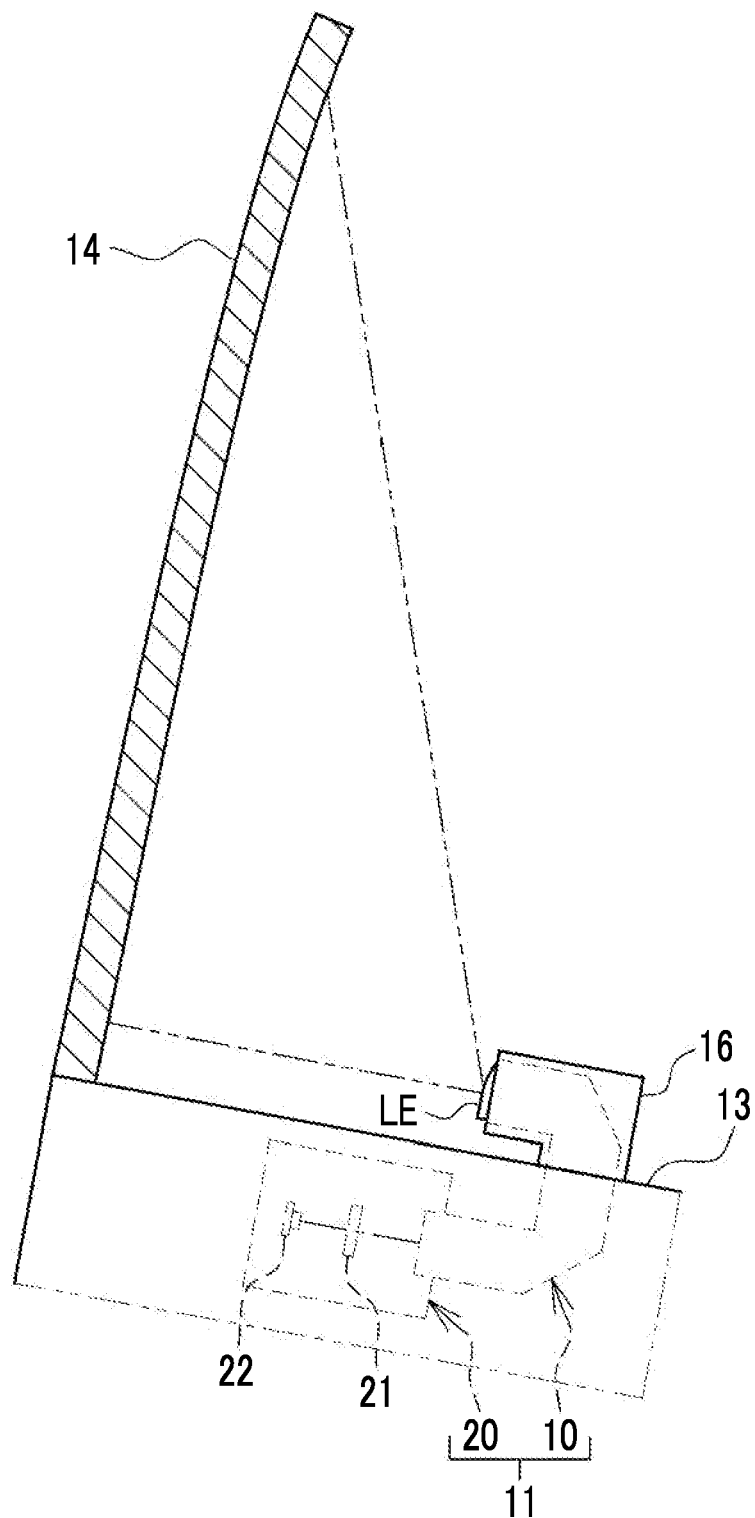
FIG. 2 is a diagram showing a projection device that includes the projection lens and an image forming unit.

As shown in FIGS. 1 and 2, a projection lens 10 is built in a projection device 11. The projection device 11 of this example is for transportation equipment, and is provided in a dashboard 13 of an automobile 12 that is an example of transportation equipment. The projection device 11 is disposed in the dashboard 13 and a part of the projection lens 10 is exposed from the upper portion of the dashboard 13. The projection device 11 projects an image P on a windshield 14 of the automobile 12 through the projection lens 10. The windshield 14 is an example of "screen" according to the technique of the present disclosure.

For example, the projection device 11 projects the image P on the windshield 14 during the stop of the automobile 12. Further, in a case where the automobile 12 will be capable of being automatically driven in the future, the projection device 11 may project the image P on the windshield 14 during automatic driving. The automatic driving is an aspect in which an accelerator, a brake, direction indicators, a steering wheel 15, and the like are automatically operated.

For example, an emission-side upper half of the projection lens 10 is exposed from the dashboard 13, and an incident-side lower half thereof is embedded in the dashboard 13. The emission-side upper half of the projection lens 10 is covered with a cover 16 that is formed integrally with the dashboard 13. An emission lens LE is disposed at an emission end portion of the projection lens 10. The emission lens LE emits the image P toward the windshield 14.

An image forming unit 20 is connected to an incident end portion of the projection lens 10. The image forming unit 20 and the projection lens 10 compose the projection device 11.

Since the projection lens 10 projects the image P on the windshield 14 from the dashboard 13 close to the windshield 14, the projection distance of the projection lens 10 is about several tens of centimeters at the most. In addition, the projection lens 10 projects the image P over a wide range of the windshield 14. For this reason, the projection lens 10 requires optical performance, such as an ultra-short focus and an ultra-wide angle of view.

Further, the center of the image P projected by the projection lens 10 and an optical axis of the emission lens LE do not coincide with each other. More specifically, the projection lens 10 projects the image P by a so-called lift-off method in which the center of the image P to be projected is positioned above the optical axis of the emission lens LE by a lens shift function. Further, the projection lens 10 can perform so-called zero offset projection in which the image P is projected so that the lower side of the image P is positioned at a point positioned on the extension line of the optical axis of the emission lens LE on the windshield 14.

The image forming unit 20 forms an image that is to be projected on the windshield 14 through the projection lens 10. The image forming unit 20 comprises an image forming panel 21, a light source 22, a light guide member (not shown), and the like. The light source 22 irradiates the image forming panel 21 with light. The light guide member guides light, which is emitted from the light source 22, to the image forming panel 21.

The image forming unit 20 is, for example, a reflective type image forming unit that uses a digital micromirror device (DMD: registered trademark) as the image forming panel 21. As well known, the DMD is an image display element which includes a plurality of micromirrors capable of changing the reflection direction of light emitted from the light source 22 and in which the respective micromirrors are two-dimensionally arranged in pixels. The DMD performs optical modulation corresponding to an image by changing the direction of each micromirror according to the image to switch the ON/OFF of reflected light of light emitted from the light source 22.

Examples of the light source 22 include a white light source. The white light source emits white light. The white light source is realized from the combination of, for example, a laser light source and a phosphor. The laser light source emits blue light to the phosphor as excitation light. The phosphor emits yellow light in a case where the phosphor is excited by blue light emitted from the laser light source. The white light source emits white light by combining blue light that is emitted from the laser light source with yellow light that is emitted from the phosphor. The image forming unit 20 is further provided with a rotary color filter that selectively converts white light emitted from the light source 22 into each of blue light, green light, and red light in a time-sharing manner. The image forming panel 21 is selectively irradiated with each of blue light, green light, and red light, so that image light where information about each of a blue image, a green image, and a red image is carried and supported is obtained. Each color image light obtained in this way is selectively incident on the projection lens 10, so that each color image light is projected toward the windshield 14. Image light corresponding to the respective colors is integrated on the windshield 14. For this reason, a full color image P is displayed on the windshield 14.

Luminous flux representing the image formed by the image forming unit 20 is incident on the projection lens 10 from the image forming unit 20. The projection lens 10 enlarges image light, which is based on the incident luminous flux, and forms an image. Accordingly, the projection lens 10 projects the image P, which is an enlarged image of the image formed by the image forming unit 20, on the windshield 14.

Figure 3:
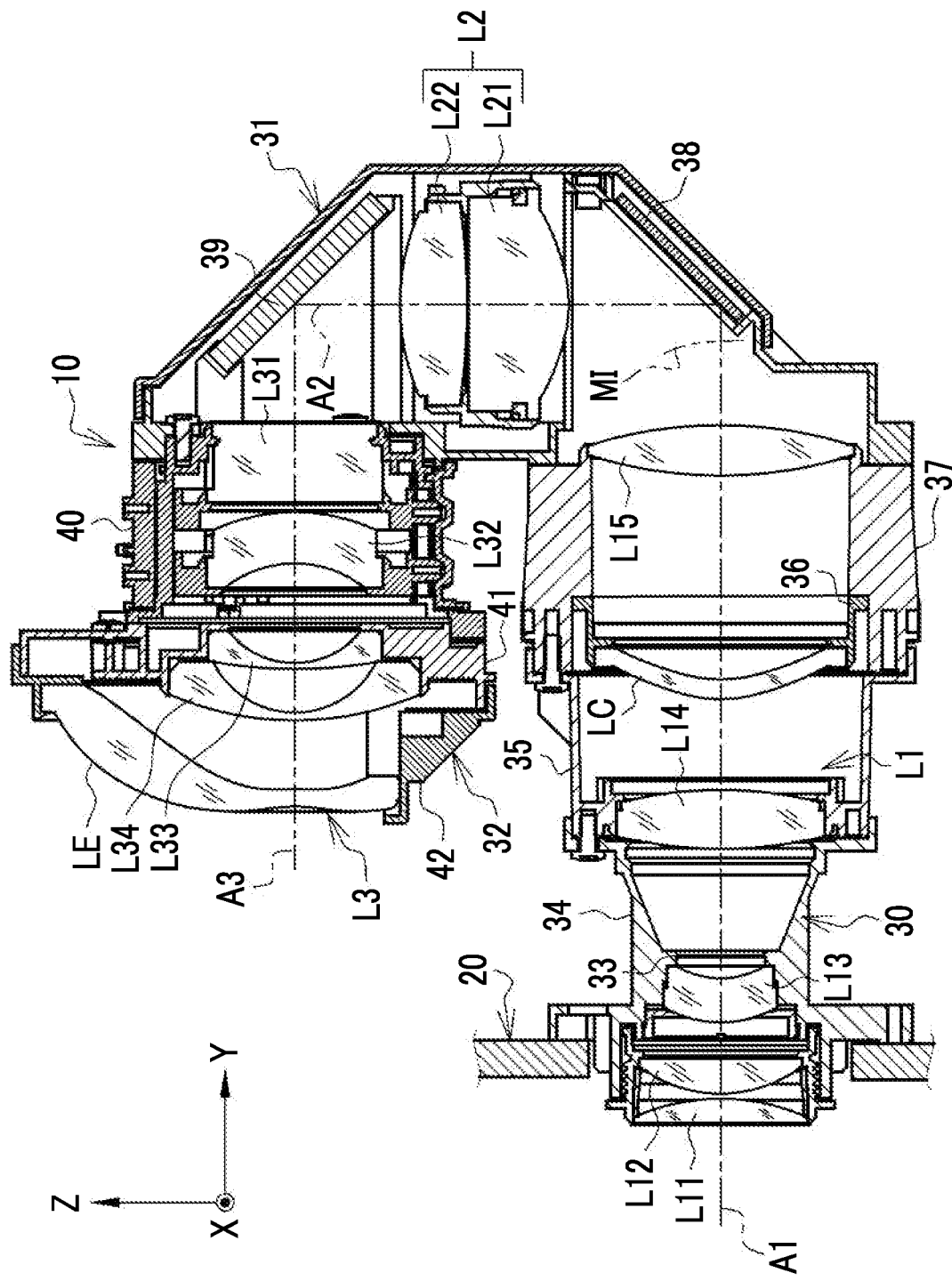
FIG. 3 is a cross-sectional view of the projection lens.

As shown in FIG. 3, the projection lens 10 comprises a bending optical system. The bending optical system has a first optical axis A1, a second optical axis A2, and a third optical axis A3. The first optical axis A1 is an optical axis along which light emitted from the image forming unit 20 passes. The second optical axis A2 is an optical axis that is bent at an angle of 90° from the first optical axis A1. The third optical axis A3 is an optical axis that is bent at an angle of 90° from the second optical axis A2. For this reason, the first optical axis A1 and the third optical axis A3 are parallel to each other. 90° mentioned here is a value that includes an error allowed in design.

In the following description, a direction parallel to the first optical axis A1 and the third optical axis A3 is represented as a Y direction, a direction parallel to the second optical axis A2 is represented as a Z direction, and a direction orthogonal to the Y direction and the Z direction is represented as an X direction.

The projection lens 10 includes a first lens barrel part 30, a second lens barrel part 31, and a third lens barrel part 32. The first lens barrel part 30 is positioned closest to an incident side, and the third lens barrel part 32 is positioned closest to an emission side. The second lens barrel part 31 is positioned between the first lens barrel part 30 and the third lens barrel part 32. The respective lens barrel parts 30 to 32 hold lenses, respectively. The lenses held by the first lens barrel part 30 are arranged on the first optical axis A1, the lenses held by the second lens barrel part 31 are arranged on the second optical axis A2, and the lenses held by the third lens barrel part 32 are arranged on the third optical axis A3. A central axis of the first lens barrel part 30 substantially coincides with the first optical axis A1, a central axis of the second lens barrel part 31 substantially coincides with the second optical axis A2, and a central axis of the third lens barrel part 32 substantially coincides with the third optical axis A3. In order to simplify description, a plurality of lenses may be omitted and represented as one lens in FIG. 3.

The first lens barrel part 30 holds a first optical system L1. The first optical system L1 is composed of, for example, a lens L11, a lens L12, a lens L13, a lens L14, a correction lens LC, and a lens L15 and is disposed along the first optical axis A1. The first optical system L1 forms an intermediate image MI of an optical image of the image forming panel 21. Further, a stationary stop 33 is provided between the lens L13 and the lens L14. The stationary stop 33 narrows the luminous flux incident from the image forming unit 20.

The lens L11, the lens L12, and the lens L13 are held by a holding frame 34. The lens L11 and the lens L12 compose, for example, a zoom lens group. The lens L14 is held by a holding frame 35. The correction lens LC is held by a holding frame (hereinafter, referred to as a correction lens-holding frame) 36. The lens L15 is held by a holding frame 37.

The holding frame 37 is not in contact with the correction lens LC and holds the correction lens-holding frame 36. The correction lens-holding frame 36 is an inner frame and the holding frame 37 is an outer frame.

The correction lens-holding frame 36 is made of, for example, a fiber-reinforced resin, such as polyphenylene sulfide with which glass fiber is mixed. On the other hand, the other holding frames 34, 35, and 37 are made of, for example, metal, such as aluminum.

The correction lens LC is a lens that is in charge of a function to mainly correct aberration, such as field curvature. For this reason, an aspherical lens including an aspheric surface, which is advantageous to correct aberration, among the lens surfaces is employed as the correction lens LC. Since it is difficult to manufacture an aspherical lens with glass, the correction lens LC is made of a resin, such as cycloolefin polymer.

On the other hand, all the lenses, which compose the first optical system L1, other than the correction lens LC are made of glass in this example. Since the dashboard 13 in which the projection lens 10 is disposed receives direct sunlight through the windshield 14, the projection lens 10 may be exposed to a high-temperature environment of about 120° C. Since the projection lens 10 is used under a high-temperature environment as described above, it is preferable that the lenses are made of glass rather than a resin in a case where only heat resistance is considered.

The correction lens LC is an example of "lens made of a resin" and "intermediate lens" according to the technique of the present disclosure. The correction lens-holding frame 36 is an example of "first holding frame" according to the technique of the present disclosure. The holding frame 37 is an example of "second holding frame" according to the technique of the present disclosure.

The second lens barrel part 31 holds a second optical system L2. The second optical system L2 is composed of, for example, a lens L21 and a lens L22 and is disposed along the second optical axis A2. The lenses L21 and L22 are made of glass. In this example, the second optical system L2 functions as a relay lens. More specifically, the second optical system L2 uses the intermediate image MI, which is formed by the first optical system L1, as a subject and relays the luminous flux representing the intermediate image MI to the third lens barrel part 32.

Further, the second lens barrel part 31 integrally holds a first mirror 38 and a second mirror 39. Each of the first and second mirrors 38 and 39 is one of optical elements composing the bending optical system and bends an optical axis. The first mirror 38 bends light parallel to the first optical axis A1 to form light parallel to the second optical axis A2. The second mirror 39 bends light parallel to the second optical axis A2 to form light parallel to the third optical axis A3.

The first mirror 38 is held in an attitude where a reflective surface forms an angle of 45° with respect to each of the first optical axis A1 and the second optical axis A2. Likewise, the second mirror 39 is held in an attitude where a reflective surface forms an angle of 45° with respect to each of the second optical axis A2 and the third optical axis A3. Each of the first and second mirrors 38 and 39 is a specular reflective type mirror of which a transparent member, such as glass, is coated with a reflective film. Each of the first and second mirrors 38 and 39 may be a mirror using a prism that totally reflects light.

Like the holding frames 34, 35, and 37 of the first lens barrel part 30, the second lens barrel part 31 is made of, for example, metal, such as aluminum.

The third lens barrel part 32 holds a third optical system L3. The third optical system L3 is an emission optical system, is composed of a lens L31, a lens L32, a lens L33, a lens L34, and an emission lens LE, and is disposed along the third optical axis A3.

The lenses L31 and L32 are held by a holding frame 40. The lenses L31 and L32 compose, for example, a focus lens group. The lenses L33 and L34 are held by a holding frame 41. The emission lens LE is held by a holding frame (hereinafter, referred to as an emission lens-holding frame) 42.

The holding frame 41 is not in contact with the emission lens LE and holds the emission lens-holding frame 42. The holding frame 41 is an inner frame and the emission lens-holding frame 42 is an outer frame.

Like the correction lens-holding frame 36, the emission lens-holding frame 42 is made of, for example, a fiber-reinforced resin, such as polyphenylene sulfide with which glass fiber is mixed. On the other hand, the other holding frames 40 and 41 are made of, for example, metal, such as aluminum.

The emission lens LE is a lens of which a part of an outer edge portion positioned below the third optical axis A3 is cut straight and which has a D shape in plan view (see also FIG. 8). Like the correction lens LC, the emission lens LE is an aspherical lens and is made of a resin, such as cycloolefin polymer. On the other hand, each of the lenses L33 and L34 positioned on the incident side of the emission lens LE is a spherical lens including a spherical lens surface and is made of glass.

As described above, the projection lens 10 requires optical performance, such as an ultra-short focus and an ultra-wide angle of view. For this reason, each of the lenses L33 and L34 has negative optical power in order to enlarge the image P to be projected and causes luminous flux to diverge.

The half angle of view of the projection lens 10 is 63° or more and is more preferably 65° or more. In order to ensure a large half angle of view, the lenses L33 and L34 require high optical power. In order to ensure high optical power, a lens made of glass is preferable to a lens made of a resin. However, since the weight of a lens is increased with an increase in the diameter of a lens surface in a case where the lens made of glass is employed, it is preferable that the diameter of the lens is small. Accordingly, each of the lenses L33 and L34 is made of glass so that high optical power can be ensured while an increase in the diameter of the lens surface is suppressed. Therefore, the angle of view of the image P to be projected can be increased in a state where the diameter of the lens surface is maintained at a relatively small diameter.

On the other hand, the emission lens LE is in charge of a function to mainly correct aberration in the third optical system L3. As described above, each of the lenses L33 and L34 has high optical power in order to realize a wide angle of view while maintaining a small diameter. In general, as optical power is increased, field curvature and distortion are increased. The aberration correction ability of an aspherical lens is higher than that of a spherical lens. For this reason, an aspherical lens is employed as the emission lens LE that is to be combined with the lenses having high optical power as in the case of the lenses L33 and L34. Further, since the emission lens LE is disposed closest to the emission side, the diameter of the lens surface of the emission lens LE is largest in the projection lens 10. It is very difficult to manufacture such an aspherical lens, which has a large diameter, with glass. Accordingly, the emission lens LE is made of a resin.

Like the correction lens LC, the emission lens LE is an example of "lens made of a resin" according to the technique of the present disclosure. Like the correction lens-holding frame 36, the emission lens-holding frame 42 is an example of "first holding frame" according to the technique of the present disclosure. Like the holding frame 37, the holding frame 41 is an example of "second holding frame" according to the technique of the present disclosure.

Figure 4:
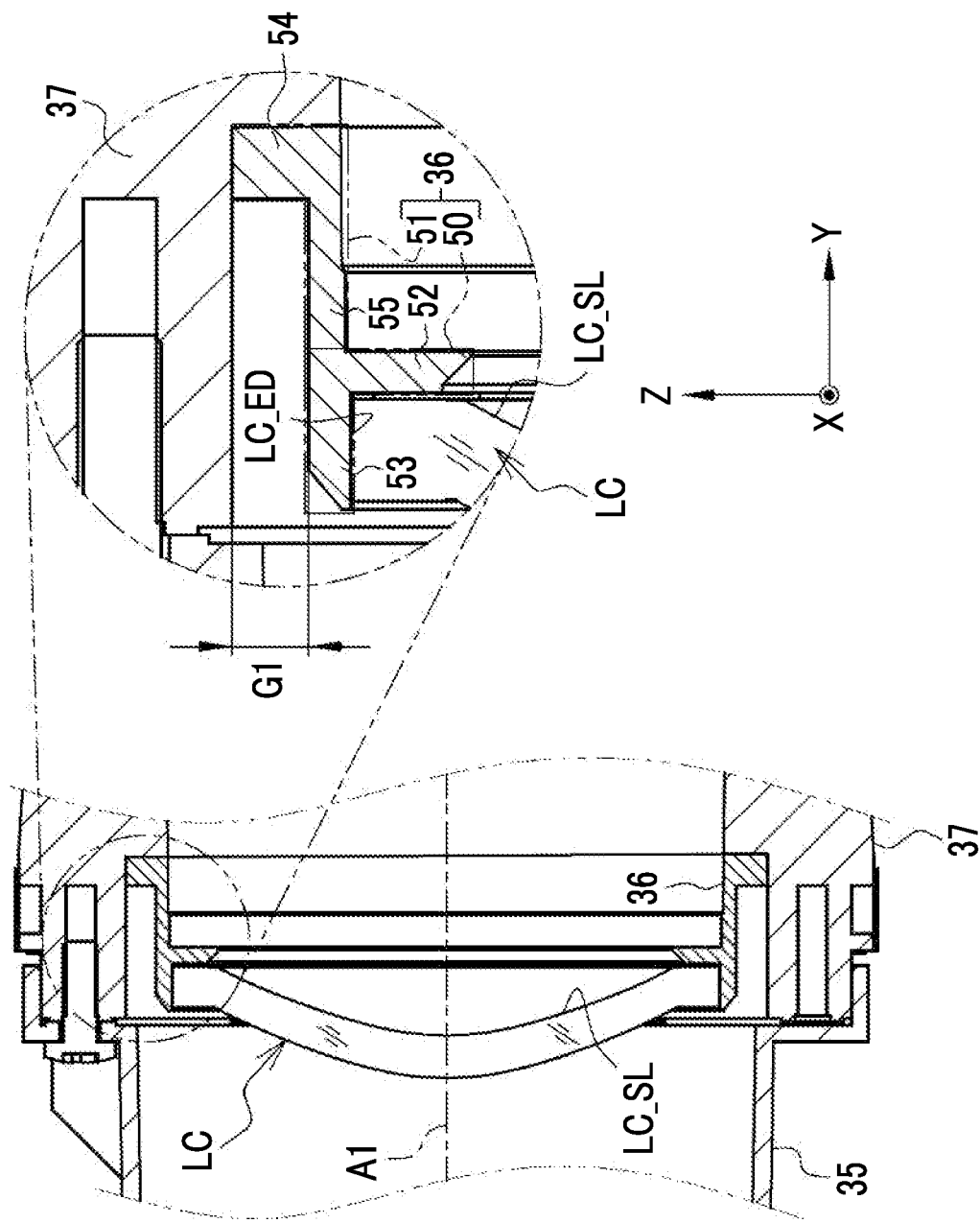
FIG. 4 is a cross-sectional view of main portions near a correction lens-holding frame.

As shown in FIG. 4, the correction lens-holding frame 36 includes a holding portion 50 and a connecting portion 51. The holding portion 50 and the connecting portion 51 are provided over the entire circumference of the correction lens-holding frame 36. The holding portion 50 holds the correction lens LC. The connecting portion 51 is connected to the holding frame 37.

The holding portion 50 includes an extending portion 52 that extends in a radial direction of the correction lens LC (a direction parallel to an XZ plane) and an extending portion 53 that extends in the direction of an optical axis of the correction lens LC (a direction parallel to the Y direction). Likewise, the connecting portion 51 includes an extending portion 54 that extends in the radial direction and an extending portion 55 that extends in the direction of the optical axis. For this reason, the holding portion 50 and the connecting portion 51 have an L shape in a cross-sectional view shown in FIG. 4.

The extending portion 52 extends toward the center of the correction lens LC from the extending portion 53. The extending portion 52 is in contact with an emission-side surface LC_SL of the correction lens LC. The extending portions 53 and 55 extend in a straight line toward the extending portion 54 in the direction of the optical axis. The extending portion 53 is in contact with an edge surface LC_ED of the correction lens LC. The edge surface LC_ED means an end surface that is formed in the circumferential direction at the outer edge of the correction lens LC. The extending portion 54 extends in the radial direction from the extending portion 55 toward the outside opposite to the extending portion 52. That is, the extending portion 54 is a flange that protrudes from the extending portion 55.

The outer peripheral surface of the extending portion 54 and the inner peripheral surface of the holding frame 37 are in contact with each other. The extending portion 54 and the holding frame 37 are connected to each other by, for example, screws. Specifically, screw insertion holes (not shown) are formed at several positions on the extending portion 54 in the circumferential direction, and screw holes (not shown) are formed at portions of the holding frame 37 corresponding to the screw insertion holes. Further, screws (not shown) are inserted into the screw insertion holes and are fastened and fixed to the screw holes. That is, the correction lens-holding frame 36 and the holding frame 37 are connected to each other through the connecting portion 51 in a state where the correction lens-holding frame 36 is disposed on the inside and the holding frame 37 is disposed on the outside in the radial direction.

A gap G1, which is formed due to the extension of the extending portion 54 in the radial direction, is provided between the correction lens-holding frame 36 and the holding frame 37. Further, the holding portion 50 holds the correction lens LC by thermal caulking. For this purpose, a distal end portion of the extending portion 53 is formed in a tapered shape so that thermal caulking is easily performed.

The extending portion 52 is an example of "first extending portion" and "first contact portion" according to the technique of the present disclosure. The extending portion 53 is an example of "second extending portion" according to the technique of the present disclosure. The extending portion 54 is an example of "third extending portion" according to the technique of the present disclosure. The extending portion 55 is an example of "fourth extending portion" according to the technique of the present disclosure.

A table 60 shown in FIG. 5 shows the materials of the correction lens LC, the correction lens-holding frame 36, and the holding frame 37 (written in FIG. 5 as "holding frame for holding correction lens-holding frame") and the thermal expansion coefficients thereof in the radial direction and the direction of the optical axis. The correction lens LC is made of a resin as described above. The correction lens-holding frame 36 is made of a fiber-reinforced resin as described above. The holding frame 37 is made of metal as described above.

The thermal expansion coefficient of the correction lens LC is $60 \times 10^{-6}$/K in both the radial direction and the direction of the optical axis. The thermal expansion coefficient of the correction lens-holding frame 36 is $40 \times 10^{-6}$/K in the radial direction and is $20 \times 10^{-6}$/K in the direction of the optical axis, and has anisotropy depending on a method of thermal expansion. The thermal expansion coefficient of the holding frame 37 is $23 \times 10^{-6}$/K in both the radial direction and the direction of the optical axis. That is, the thermal expansion coefficient of the correction lens LC is highest in both the radial direction and the direction of the optical axis. The thermal expansion coefficient of the correction lens-holding frame 36 in the radial direction is about twice as high as the thermal expansion coefficient of the holding frame 37 in the radial direction. The thermal expansion coefficient of the holding frame 37 in the direction of the optical axis is higher than the thermal expansion coefficient of the correction lens-holding frame 36 in the direction of the optical axis, but a difference therebetween is small as compared to that in the radial direction. The correction lens-holding frame 36 is formed so that the orientation direction of the fiber of the fiber-reinforced resin is parallel to the direction of the optical axis. Accordingly, the thermal expansion coefficient of the correction lens-holding frame 36 in the direction of the optical axis is lower than the thermal expansion coefficient of the correction lens-holding frame 36 in the radial direction. The thermal expansion coefficient of the correction lens-holding frame 36 in the radial direction may be lower than the thermal expansion coefficient of the correction lens-holding frame 36 in the direction of the optical axis.

In a case where a thermal expansion coefficient in the radial direction and a thermal expansion coefficient in the direction of the optical axis are different from each other as in the case of the correction lens-holding frame 36, a higher one of the thermal expansion coefficient in the radial direction and the thermal expansion coefficient in the direction of the optical axis, that is, the thermal expansion coefficient in the radial direction in this example is used to compare the magnitude of the thermal expansion coefficient of the correction lens-holding frame 36 with the magnitude of the thermal expansion coefficient of the holding frame 37. For this reason, it can be said that the thermal expansion coefficient of the correction lens-holding frame 36 is higher than that of the holding frame 37.

Figure 6:
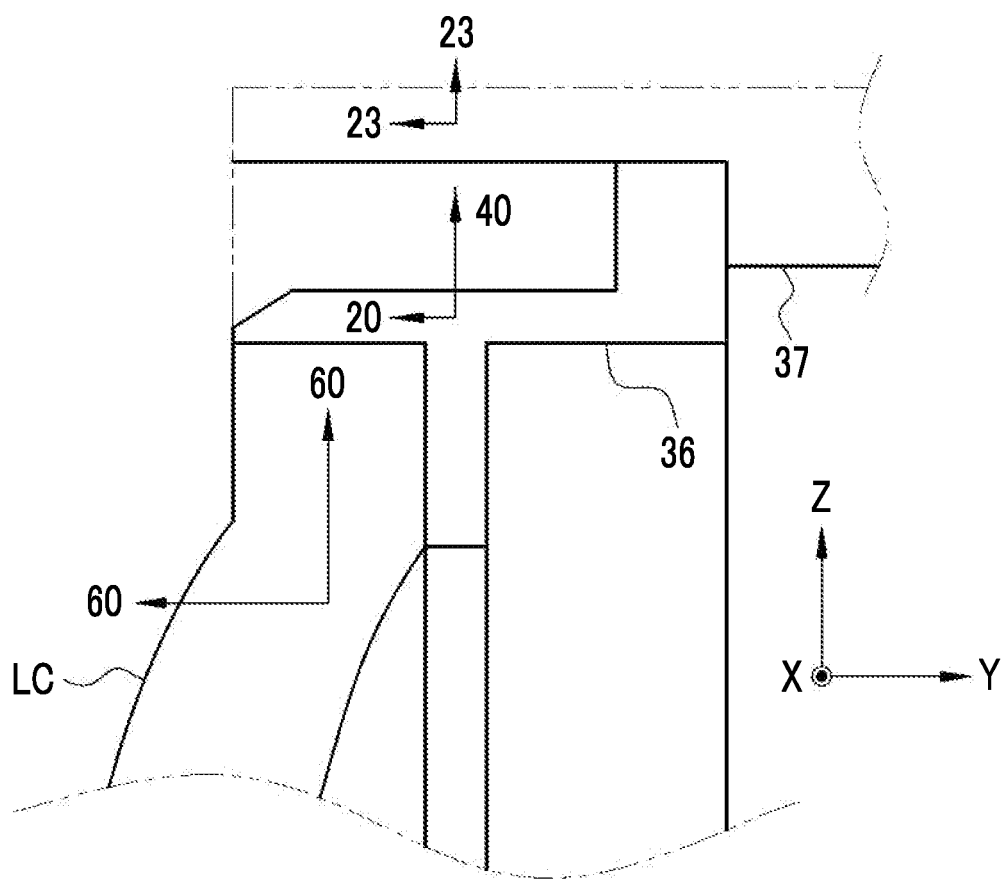
FIG. 6 is a schematic diagram showing the thermal expansion coefficients of the correction lens, the correction lens-holding frame, and the holding frame, which holds the correction lens-holding frame, with arrows and numerical values.

FIG. 6 is a schematic diagram showing the thermal expansion coefficients of the correction lens LC, the correction lens-holding frame 36, and the holding frame 37 in the radial direction and the thermal expansion coefficients thereof in the direction of the optical axis with arrows and numerical values ($\times 10^{-6}$/K will be omitted). The thermal expansion coefficients of the respective members, that is, the correction lens LC, the correction lens-holding frame 36, and the holding frame 37 in the radial direction are reduced toward the outside. For simplification, hatching and the like representing a cross section will be omitted in FIG. 6.

Figure 7:
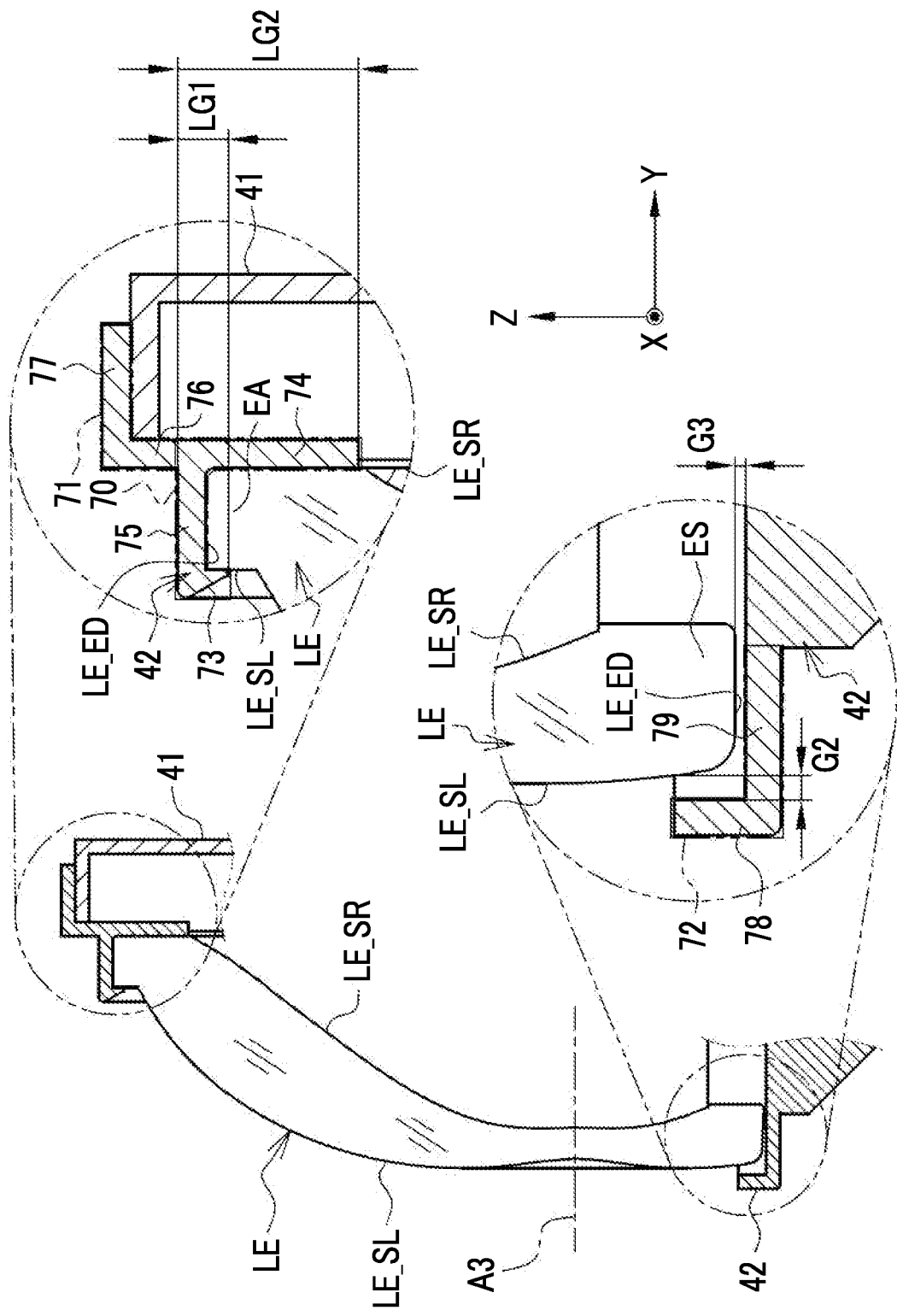
FIG. 7 is a cross-sectional view of main portions near an emission lens-holding frame.
Figure 8:
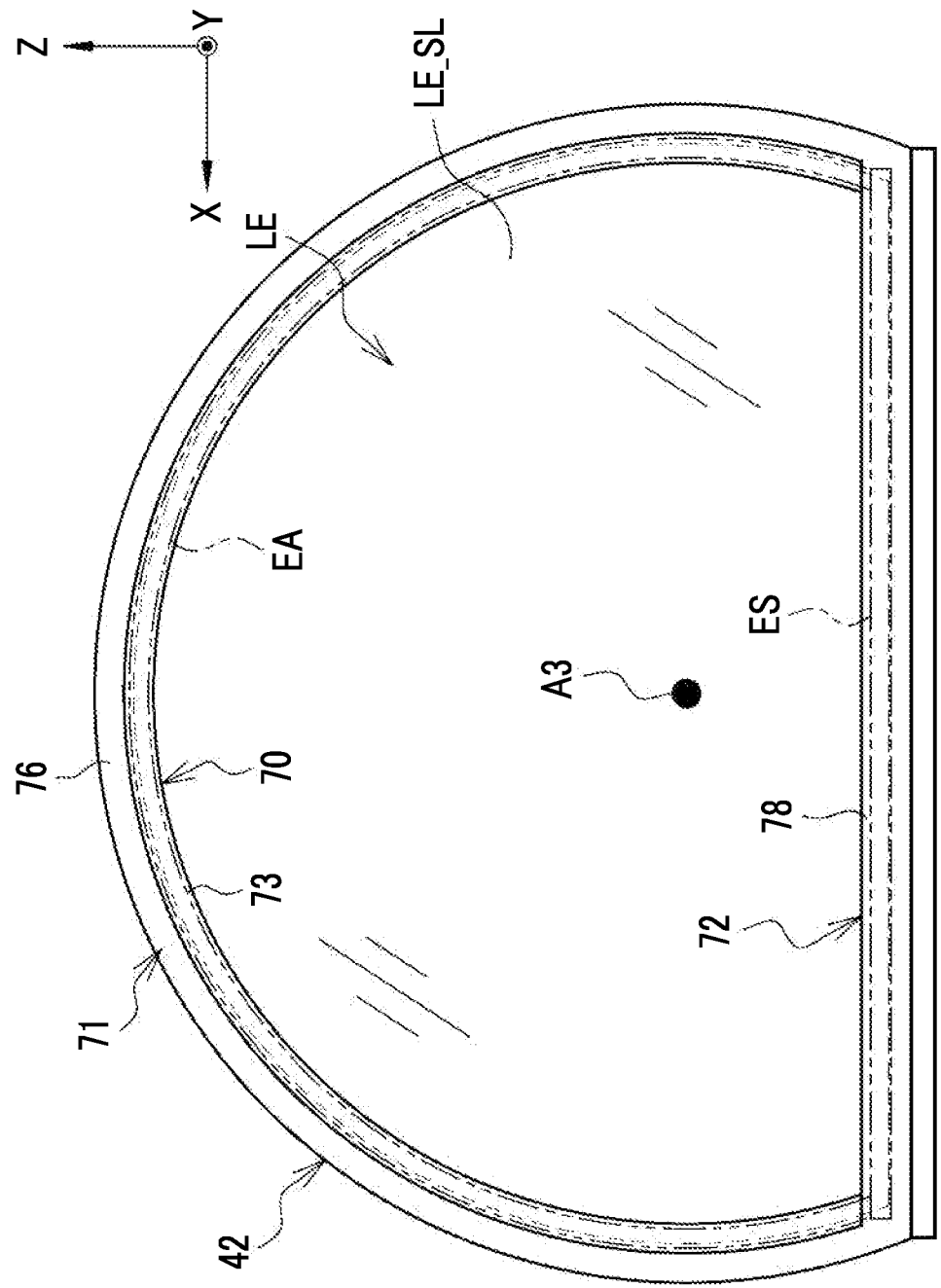
FIG. 8 is a plan view of an emission lens and the emission lens-holding frame.

As shown in FIGS. 7 and 8, the emission lens-holding frame 42 includes a holding portion 70, a connecting portion 71, and a facing portion 72. The holding portion 70 holds the emission lens LE. More specifically, the holding portion 70 holds an arcuate outer edge portion EA of the emission lens LE. The connecting portion 71 is connected to the holding frame 41. The facing portion 72 faces a linear outer edge portion ES that is a linearly extending portion of the emission lens LE. That is, the linear outer edge portion ES is an example of "a part of the outer edge portion of a lens" according to the technique of the present disclosure.

The holding portion 70 includes an extending portion 73 and an extending portion 74 that extend in a radial direction of the emission lens LE, and an extending portion 75 that extends in the direction of an optical axis of the emission lens LE. The extending portions 73 and 74 extend toward the center of the emission lens LE from the extending portion 75. A length LG2 of the extending portion 74 in the radial direction is longer than a length LG1 of the extending portion 73 in the radial direction. The extending portion 73 is in contact with an emission-side surface LE_SL of the emission lens LE. On the other hand, the extending portion 74 is in contact with an incident-side surface LE_SR of the emission lens LE. Further, the extending portion 75 is in contact with an edge surface LE_ED of the emission lens LE. The edge surface LE_ED means an end surface that is formed in the circumferential direction at the outer edge of the emission lens LE.

The connecting portion 71 includes an extending portion 76 that extends in the radial direction and an extending portion 77 that extends in the direction of the optical axis. For this reason, the connecting portion 71 has an L shape in a cross-sectional view shown in FIG. 7. The extending portion 76 extends outward in a straight line from the extending portion 74 of the holding portion 70 in the radial direction. The extending portion 76 is a flange that protrudes from the extending portion 75. The extending portion 77 is a portion that further extends from the extending portion 76 to the incident side in the direction of the optical axis.

The inner peripheral surface of the extending portion 77 and the outer peripheral surface of the holding frame 41 are in contact with each other. Like the extending portion 54 of the correction lens-holding frame 36 and the holding frame 37, the extending portion 77 and the holding frame 41 are connected to each other by, for example, screws. Specifically, screw insertion holes (not shown) are formed at several positions on the extending portion 77 in the circumferential direction, and screw holes (not shown) are formed at portions of the holding frame 41 corresponding to the screw insertion holes. Further, screws (not shown) are inserted into the screw insertion holes and are fastened and fixed to the screw holes. That is, the emission lens-holding frame 42 and the holding frame 41 are connected to each other through the connecting portion 71 in a state where the emission lens-holding frame 42 is disposed on the outside and the holding frame 41 is disposed on the inside in the radial direction.

The holding portion 70 holds the emission lens LE by thermal caulking. For this purpose, a distal end portion of the extending portion 73 is formed in a tapered shape so that thermal caulking is easily performed.

The extending portions 73 and 74 are an example of "first extending portion" according to the technique of the present disclosure. Further, the extending portion 73 is an example of "first contact portion" according to the technique of the present disclosure. The extending portion 74 is an example of "second contact portion" according to the technique of the present disclosure. The extending portion 75 is an example of "second extending portion" according to the technique of the present disclosure. Furthermore, the extending portion 76 is an example of "third extending portion" according to the technique of the present disclosure. The extending portion 77 is an example of "fourth extending portion" according to the technique of the present disclosure.

The facing portion 72 includes an extending portion 78 that extends in the radial direction and an extending portion 79 that extends in the direction of the optical axis. For this reason, the facing portion 72 has an L shape in a cross-sectional view shown in FIG. 7. The extending portion 78 faces the emission-side surface LE_SL of the emission lens LE. The extending portion 79 faces the edge surface LE_ED of the emission lens LE.

The extending portion 78 is not in contact with the emission-side surface LE_SL of the emission lens LE. Likewise, the extending portion 79 is not in contact with the edge surface LE_ED of the emission lens LE. That is, the facing portion 72 (extending portion 78) has a gap G2 between itself and the linear outer edge portion ES of the emission lens LE in the direction of the optical axis. Further, the facing portion 72 (extending portion 79) has a gap G3 between itself and the linear outer edge portion ES of the emission lens LE in the radial direction.

Figure 9:
FIG. 9 is a table showing the materials and thermal expansion coefficients of the emission lens, the emission lens-holding frame, and a holding frame for holding the emission lens-holding frame.

A table 100 shown in FIG. 9 shows the materials of the emission lens LE, the emission lens-holding frame 42, and the holding frame 41 (written in FIG. 9 as "holding frame for holding emission lens-holding frame") and the thermal expansion coefficients thereof in the radial direction and the direction of the optical axis. The emission lens LE is made of a resin as described above. The emission lens-holding frame 42 is made of a fiber-reinforced resin as described above. The holding frame 41 is made of metal as described above.

The thermal expansion coefficient of the emission lens LE is $60\times10^{-6}$/K in both the radial direction and the direction of the optical axis like the correction lens LC. The thermal expansion coefficient of the emission lens-holding frame 42 is $40\times10^{-6}$/K in the radial direction and is $20\times10^{-6}$/K in the direction of the optical axis like the correction lens-holding frame 36. The thermal expansion coefficient of the holding frame 41 is $23\times10^{-6}$/K in both the radial direction and the direction of the optical axis like the holding frame 37. That is, the thermal expansion coefficient of the emission lens LE is highest in both the radial direction and the direction of the optical axis. The thermal expansion coefficient of the emission lens-holding frame 42 in the radial direction is about twice as high as the thermal expansion coefficient of the holding frame 41 in the radial direction. The thermal expansion coefficient of the holding frame 41 in the direction of the optical axis is higher than the thermal expansion coefficient of the emission lens-holding frame 42 in the direction of the optical axis, but a difference therebetween is small as compared to that in the radial direction.

As in the case of the correction lens-holding frame 36, a higher one of the thermal expansion coefficient in the radial direction and the thermal expansion coefficient in the direction of the optical axis, that is, the thermal expansion coefficient in the radial direction in this example is used to compare the magnitude of the thermal expansion coefficient of the holding frame 41 with the magnitude of the thermal expansion coefficient of the emission lens-holding frame 42. For this reason, it can be said that the thermal expansion coefficient of the emission lens-holding frame 42 is higher than that of the holding frame 41.

Figure 10:
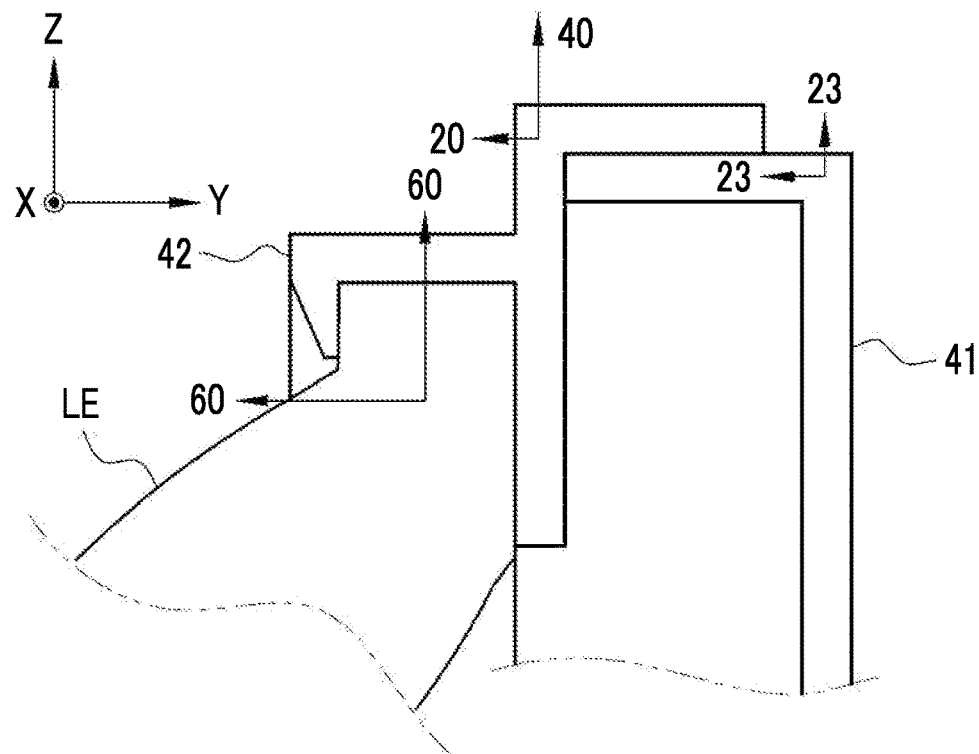
FIG. 10 is a schematic diagram showing the thermal expansion coefficients of the emission lens, the emission lens-holding frame, and the holding frame, which holds the emission lens-holding frame, with arrows and numerical values.

FIG. 10 is a schematic diagram showing the thermal expansion coefficients of the emission lens LE, the emission lens-holding frame 42, and the holding frame 41 in the radial direction and the thermal expansion coefficients thereof in the direction of the optical axis with arrows and numerical values ($\times10^{-6}$/K will be omitted). For simplification, hatching and the like representing a cross section will be omitted in FIG. 10 as in FIG. 6.

Next, the action of the above-mentioned configuration will be described mainly with reference to FIG. 3. First, luminous flux representing an image formed by the image forming unit 20 is incident on the lens L11 of the first optical system L1 of the projection lens 10. Subsequently, the luminous flux passes through the lenses L12 and L13 and passes through the stationary stop 33, so that the amount of light is adjusted. The luminous flux of which the amount of light is adjusted by the stationary stop 33 passes through the lens L14 and further passes through the correction lens LC. Aberration is corrected by the correction lens LC and the like.

Since the correction lens LC is made of a resin, the thermal expansion coefficient of the correction lens LC is relatively high as shown in FIGS. 5 and 6. Further, in a case where the projection lens 10 is for transportation equipment, such as the automobile 12, the thermal expansion of the correction lens LC cannot be avoided since a temperature reaches a very high temperature of about 120° C. depending on an environment, such as the hot sun in summer.

A case where the correction lens-holding frame 36 is made of a material, which is relatively difficult to thermally expand, such as metal, in other words, a material having relatively high stiffness like the holding frame 37 will be considered. In this case, since there is no place to which the correction lens LC having thermally expanded is to escape, excessive stress is applied to the correction lens LC. For this reason, there is a concern that the correction lens LC will be deformed as a whole. There is also a concern that the correction lens LC will crack in some cases. Further, in a case where the thermal expansion of the correction lens LC is settled and the correction lens LC contracts, there is also a concern that a holding mark will be formed on a portion of the correction lens LC held by the holding portion 50. Since a problem that field curvature or the like cannot be corrected or the first optical axis A1 is shifted is caused by such deformation, the holding mark, or the like, there is a concern that the performance of the correction lens LC cannot be maintained.

On the contrary, a case where the holding frame 37 is made of a material, which is relatively likely to thermally expand, such as a fiber-reinforced resin, in other words, a material having relatively low stiffness like the correction lens-holding frame 36 will be considered. In this case, the holding frame 37 thermally expands to the same extent as the correction lens-holding frame 36. However, since the holding frame 37 holds not the correction lens LC but the correction lens-holding frame 36, the holding frame 37 does not need to thermally expand to the same extent as the correction lens-holding frame 36. Since there is a concern that the first optical axis A1 will be shifted in a case where the holding frame 37 thermally expands, it is better that the holding frame 37 does not thermally expand. Accordingly, it is better that the thermal expansion coefficient of the holding frame 37 is set to be lower than the thermal expansion coefficient of the correction lens-holding frame 36.

Accordingly, in this embodiment, the correction lens LC is held by the correction lens-holding frame 36 and the correction lens-holding frame 36 is held by the holding frame 37 as shown in FIG. 4. Further, the thermal expansion coefficient of the correction lens-holding frame 36 is set to be higher than the thermal expansion coefficient of the holding frame 37 as shown in FIGS. 5 and 6. The idea is that the correction lens LC is not directly held by the holding frame 37, the correction lens LC is held by the correction lens-holding frame 36 having a thermal expansion coefficient between the thermal expansion coefficient of the correction lens LC and the thermal expansion coefficient of the holding frame 37, and the correction lens-holding frame 36 is disposed between the correction lens LC and the holding frame 37. Therefore, the correction lens-holding frame 36 is made to function as a buffer member that absorbs the thermal expansion of the correction lens LC.

Figure 11:
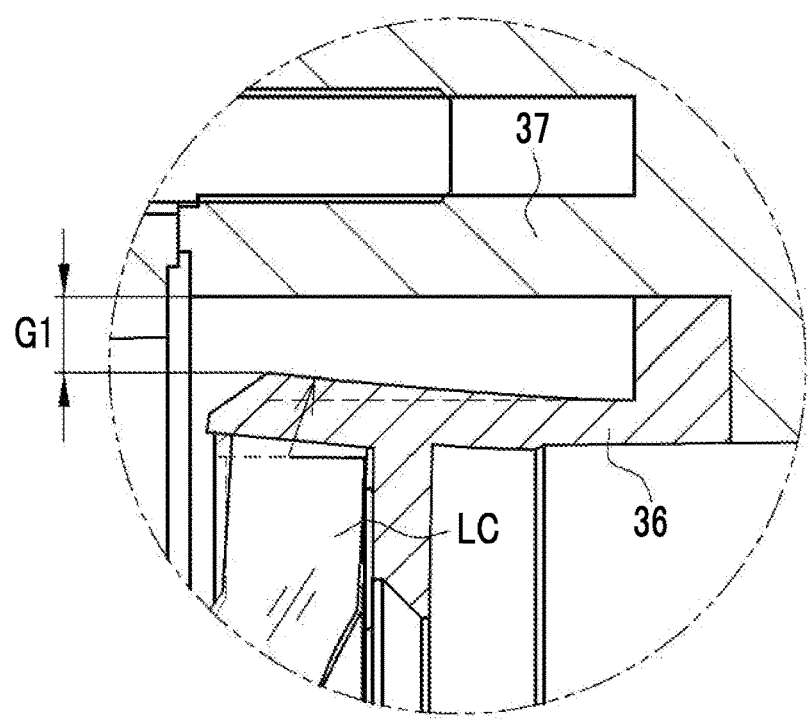
FIG. 11 is a cross-sectional view of main portions near a holding portion of the correction lens-holding frame in a case where the correction lens thermally expands.

Accordingly, as shown in FIG. 11, the correction lens-holding frame 36 is elastically deformed in a direction where the correction lens-holding frame 36 fills the gap G1 as the correction lens LC thermally expands. Since the correction lens-holding frame 36 is elastically deformed in this way, elongation caused by the thermal expansion of the correction lens LC is absorbed. For this reason, it is possible to prevent the correction lens LC from being deformed as a whole or cracking or to prevent a holding mark from being formed on the correction lens LC. As a result, the performance of the correction lens LC can be maintained.

Further, the correction lens-holding frame 36 and the holding frame 37 are connected to each other through the connecting portion 51 in a state where the correction lens-holding frame 36 is disposed on the inside and the holding frame 37 is disposed on the outside in the radial direction of the correction lens LC. In addition, the gap G1 is provided between the correction lens-holding frame 36 and the holding frame 37. The gap G1 is a space that allows the elastic deformation of the correction lens-holding frame 36 caused by the thermal expansion of the correction lens LC. In a case where the gap G1 is not empty, the elastic deformation of the correction lens-holding frame 36 caused by the thermal expansion of the correction lens LC is hindered by the holding frame 37 since the correction lens-holding frame 36 is disposed on the inside and the holding frame 37 is disposed on the outside. Since there is the gap G1, the elastic deformation of the correction lens-holding frame 36 caused by the thermal expansion of the correction lens LC can occur. It is preferable that the gap G1 is empty to such an extent that the elastic deformation of the correction lens-holding frame 36 is not hindered.

The holding portion 50 of the correction lens-holding frame 36 includes the extending portion 52 that extends in the radial direction of the correction lens LC and the extending portion 53 that extends in the direction of the optical axis of the correction lens LC. Further, the connecting portion 51 of the correction lens-holding frame 36 includes the extending portion 54 that extends in the radial direction and the extending portion 55 that extends in the direction of the optical axis. For this reason, elongation caused by the thermal expansion of the correction lens LC in the radial direction can be absorbed by elongation caused by the thermal expansion of the extending portions 52 and 54. Furthermore, elongation caused by the thermal expansion of the correction lens LC in the direction of the optical axis can be absorbed by elongation caused by the thermal expansion of the extending portions 53 and 55.

The extending portion 52 is in contact with the emission-side surface LC_SL of the correction lens LC. Further, the extending portion 53 is in contact with the edge surface LC_ED of the correction lens LC. For this reason, the correction lens LC can be reliably positioned by the extending portions 52 and 53.

Luminous flux having passed through the correction lens LC is incident on the lens L15. Then, the intermediate image MI is formed to be closer to the incident side than the first mirror 38, that is, at a position between the lens L15 and the first mirror 38.

Luminous flux having passed through the lens L15 is bent at an angle of 90° by the first mirror 38 to form light parallel to the second optical axis A2, and passes through the second optical system L2.

Luminous flux having passed through the second optical system L2 is bent at an angle of 90° again by the second mirror 39 to form light parallel to the third optical axis A3. Then, the light passes through the lenses L31, L32, L33, and L34 of the third optical system L3, finally passes through the emission lens LE, and is projected on the windshield 14 as the image P.

Since the emission lens LE is made of a resin like the correction lens LC, the thermal expansion coefficient of the emission lens LE is relatively high as shown in FIGS. 9 and 10. For this reason, the thermal expansion of the emission lens LE cannot be avoided like the correction lens LC. Accordingly, in this embodiment, the emission lens LE is held by the emission lens-holding frame 42 and the emission lens-holding frame 42 is held by the holding frame 41 as shown in FIGS. 7 and 8. Further, the thermal expansion coefficient of the emission lens-holding frame 42 is set to be higher than the thermal expansion coefficient of the holding frame 41.

Figure 12:
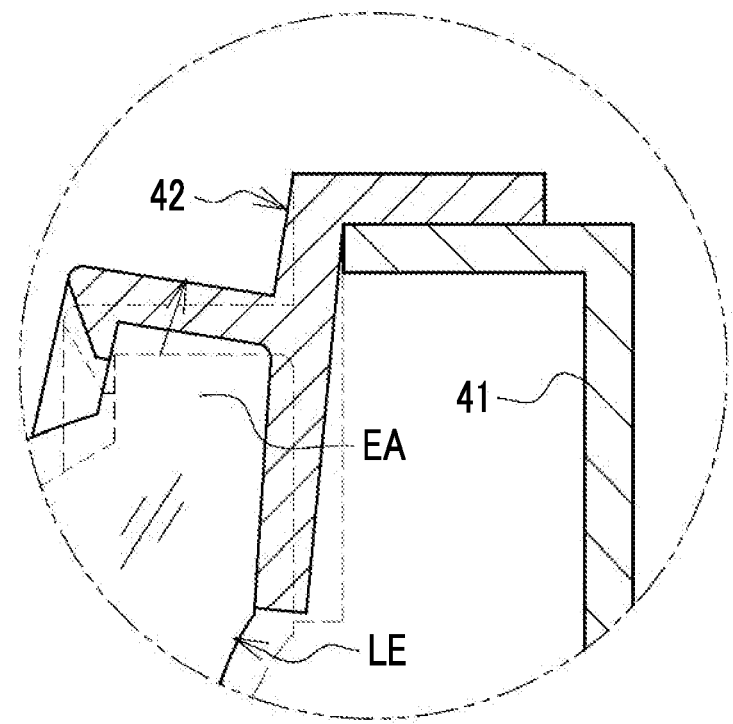
FIG. 12 is a cross-sectional view of main portions near a holding portion of the emission lens-holding frame in a case where the emission lens thermally expands.

Accordingly, as shown in FIG. 12, the emission lens-holding frame 42 is elastically deformed as the emission lens LE thermally expands. Since the emission lens-holding frame 42 is elastically deformed in this way, elongation caused by the thermal expansion of the emission lens LE is absorbed. For this reason, the performance of the emission lens LE can be maintained as in the case of the correction lens LC.

Further, the emission lens-holding frame 42 and the holding frame 41 are connected to each other through the connecting portion 71 in a state where the emission lens-holding frame 42 is disposed on the outside and the holding frame 41 is disposed on the inside in the radial direction of the emission lens LE. For this reason, the emission lens-holding frame 42 can be elastically deformed without being hindered by the holding frame 41.

Furthermore, the linear outer edge portion ES of the emission lens LE faces the facing portion 72 of the emission lens-holding frame 42, and the gaps G2 and G3 are provided between the facing portion 72 and the linear outer edge portion ES.

Figure 13:
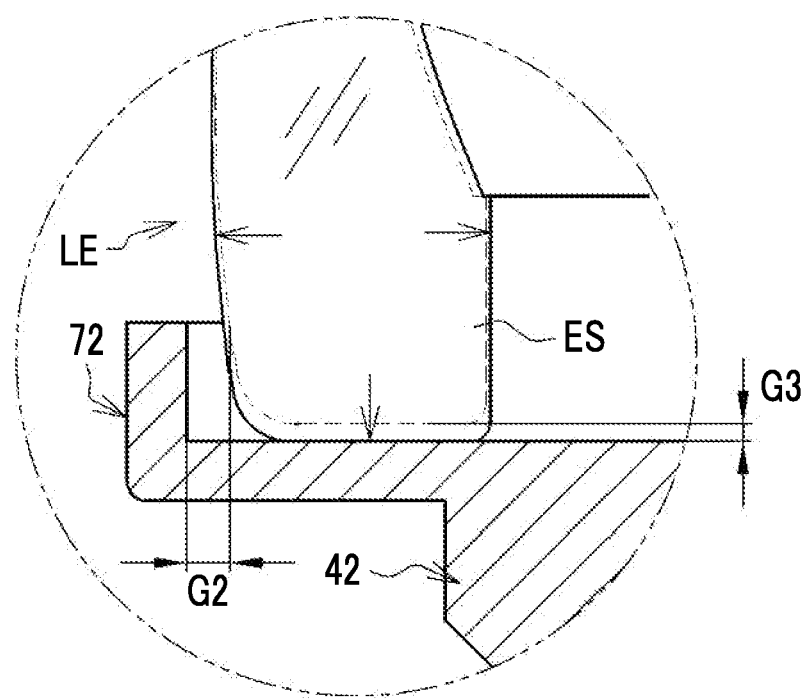
FIG. 13 is a cross-sectional view of main portions near a facing portion of the emission lens-holding frame in a case where the emission lens thermally expands.

Accordingly, the gaps G2 and G3 serve as places to which the emission lens LE having thermally expanded is to escape as shown in FIG. 13. Since not only elongation caused by the thermal expansion of the emission lens LE is absorbed by elastic deformation as shown in FIG. 12 but also the gaps G2 and G3 serving as places to which the emission lens LE having thermally expanded in this way is to escape are prepared in advance, the performance of the emission lens LE can be maintained. It is preferable that the gaps G2 and G3 are larger than the maximum elongation of the emission lens LE.

Elongation caused by the thermal expansion of the emission lens LE is absorbed by two methods, that is, a method using elastic deformation and a method using the gaps G2 and G3. For this reason, even in a case where the emission lens-holding frame 42 is in a state where the emission lens-holding frame 42 cannot be elastically deformed due to a certain reason, any amount of elongation caused by the thermal expansion of the emission lens LE can be absorbed by the gaps G2 and G3.

As shown in FIG. 7, the holding portion 70 of the emission lens-holding frame 42 includes the extending portions 73 and 74 that extend in the radial direction of the emission lens LE and the extending portion 75 that extends in the direction of the optical axis of the emission lens LE. Further, the connecting portion 71 of the emission lens-holding frame 42 includes the extending portion 76 that extends in the radial direction and the extending portion 77 that extends in the direction of the optical axis. For this reason, elongation caused by the thermal expansion of the emission lens LE in the radial direction can be absorbed by elongation caused by the thermal expansion of the extending portions 73, 74, and 76. Furthermore, elongation caused by the thermal expansion of the emission lens LE in the direction of the optical axis can be absorbed by elongation caused by the thermal expansion of the extending portions 75 and 77.

The extending portion 73 is in contact with the emission-side surface LE_SL of the emission lens LE. Further, the extending portion 74 is in contact with the incident-side surface LE_SR of the emission lens LE. Furthermore, the extending portion 75 is in contact with the edge surface LE_ED of the emission lens LE. For this reason, the emission lens LE can be reliably positioned by the extending portions 73, 74, and 75.

The emission lens LE is a lens that is disposed closest to the emission side. Further, the image P is projected on the windshield 14 from the dashboard 13. Since the emission lens LE is a lens having negative optical power and rays emitted from the emission lens LE spread around the optical axis, the diameter of the emission-side surface LE_SL of the emission lens LE is set to be larger than the diameter of the incident-side surface LE_SR.

For this reason, a length LG2 of the extending portion 74, which is in contact with the incident-side surface LE_SR, in the radial direction is set to be longer than a length LG1 of the extending portion 73, which is in contact with the emission-side surface LE_SL, in the radial direction. Accordingly, the emission lens LE can be reliably supported on the incident-side surface LE_SR, which has a relatively small diameter of the lens surface, by the extending portion 74.

The thermal expansion coefficients of the correction lens LC and the emission lens LE are higher than the thermal expansion coefficients of the correction lens-holding frame 36 and the emission lens-holding frame 42, respectively. For this reason, it is possible to prevent a problem that forces holding the correction lens LC and the emission lens LE are reduced since the correction lens-holding frame 36 and the emission lens-holding frame 42 thermally expand more than the correction lens LC and the emission lens LE.

The thermal expansion coefficients of the correction lens-holding frame 36 and the emission lens-holding frame 42 in the direction of the optical axis are lower than the thermal expansion coefficients thereof in the radial direction. For this reason, since the elongation of the correction lens-holding frame 36 and the emission lens-holding frame 42 in the direction of the optical axis, which is caused by thermal expansion, can be reduced, the deterioration of the quality of the image P can be suppressed.

The distal end of the correction lens-holding frame 36, which holds the correction lens LC, and the distal end of the emission lens-holding frame 42, which holds the emission lens LE, have a tapered shape. For this reason, thermal caulking can be easily performed. Further, since the correction lens LC and the emission lens LE are held by thermal caulking, it is not necessary to fit separate press rings to the correction lens-holding frame 36 and the emission lens-holding frame 42 to fix the correction lens LC and the emission lens LE to the correction lens-holding frame 36 and the emission lens-holding frame 42. As a result, component cost and manufacturing cost can be reduced.

The emission lens LE is exposed from the projection lens 10. For this reason, since the emission lens LE is likely to receive direct sunlight, the emission lens LE is directly affected by an ambient temperature. For this reason, it is highly necessary to take a countermeasure against the above-mentioned thermal expansion of the emission lens LE. Further, since the emission lens LE has a large diameter, the emission lens LE has the largest amount of thermal expansion among the lenses used for the projection lens 10. For this reason, it is particularly effective that the emission lens LE takes a countermeasure against the thermal expansion of a lens, which is made of a resin, according to the technique of the present disclosure.

The projection lens 10 is for transportation equipment. For this reason, the projection lens 10 is exposed to a harsh temperature environment of about 120° C. as described above. Accordingly, in a case where the projection lens 10 is used for transportation equipment, a countermeasure against the thermal expansion of a lens, which is made of a resin, according to the technique of the present disclosure is particularly effective.

Figure 14:
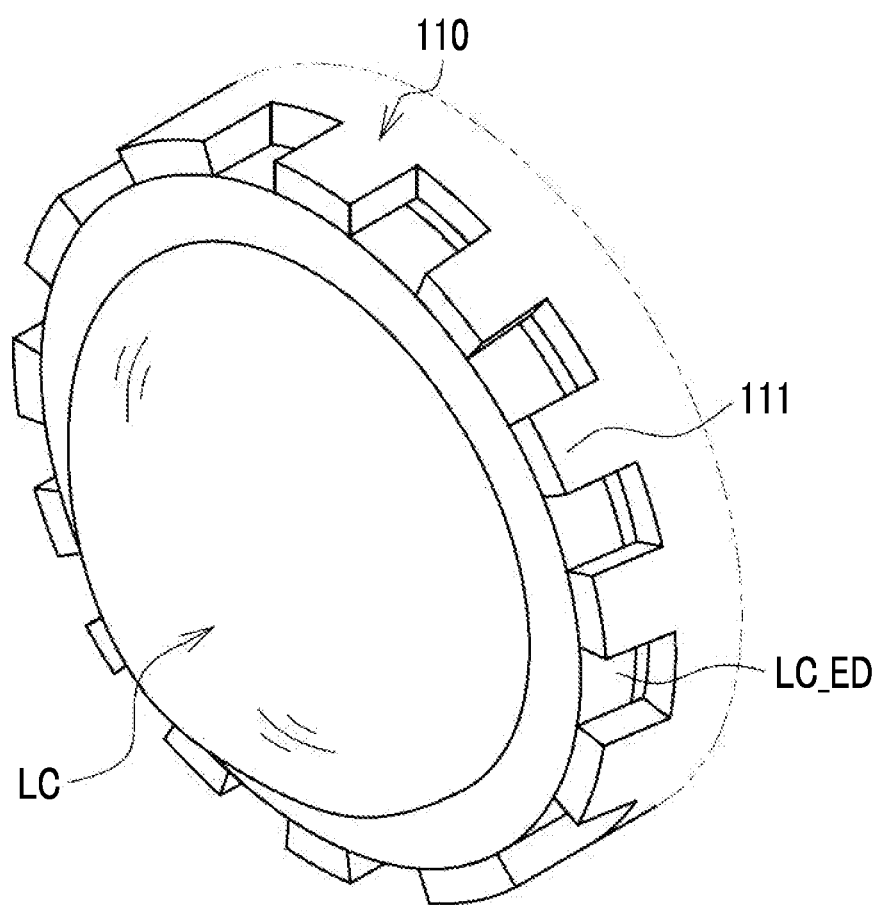
FIG. 14 is a diagram showing another example of the correction lens-holding frame.

The holding portion 50 is provided over the entire circumference of the correction lens-holding frame 36 in the embodiment, but the present disclosure is not limited thereto. As in the correction lens-holding frame 110 shown in FIG. 14, holding portions 111 may be provided at a plurality of positions at regular intervals in the circumferential direction. According to the holding portions 111 having such configuration, since the correction lens-holding frame is likely to be elastically deformed as compared to the holding portion 50 provided over the entire circumference, elongation caused by the thermal expansion of the correction lens LC can be absorbed more effectively. Further, since the edge surface LC_ED of the correction lens LC is exposed in places, the heat dissipation of the correction lens LC can be improved as compared to the case of the correction lens-holding frame 36 that is provided with the holding portion 50 over the entire circumference thereof. Three holding portions 111 may be arranged at intervals of at least 120°.

As long as the thermal expansion coefficients of the correction lens-holding frame 36 and the emission lens-holding frame 42 are higher than the thermal expansion coefficients of the holding frame 37 and the holding frame 41, the materials of the thermal expansion coefficients of the correction lens-holding frame 36 and the emission lens-holding frame 42 are not limited to an exemplified fiber-reinforced resin. However, a fiber-reinforced resin is relatively inexpensive, is relatively easily subjected to working, such as thermal caulking, and has both flexibility and stiffness suitable for a holding frame for a lens. For this reason, the fiber-reinforced resin is suitable as the materials of the correction lens-holding frame 36 and the emission lens-holding frame 42.

The materials of the holding frames 37 and 41 are also not limited to exemplified metal. However, metal is generally excellent in heat resistance. Further, since metal has relatively high stiffness, metal is less likely to be bent. Since this property of being less likely to be bent is a particularly required property since vibration generated during the travel of transportation equipment is applied to the projection lens 10 for transportation equipment of this example. For this reason, metal is suitable as the materials of the holding frames 37 and 41.

The correction lens LC and the emission lens LE, which are aspherical lens, have been exemplified as a lens made of a resin in the embodiment, but the lens made of a resin is not limited thereto. The lens made of a resin may be a spherical lens made of a resin. Further, the lens made of a resin may be a lens that is disposed closest to the incident side.

The automobile 12 has been exemplified as transportation equipment in the embodiment, but the transportation equipment is not limited thereto. The transportation equipment may be a construction vehicle, a railroad car, a ship, an airplane, and the like. Further, the projection lens 10 for transportation equipment has been exemplified in the embodiment, but the present disclosure is not limited thereto. For example, the projection lens 10 may be a projection lens for outdoor use.

A transmission type image forming panel, which uses a liquid crystal display (LCD) instead of a DMD, may be used as the image forming panel 21. Alternatively, a panel using a self light-emitting element, such as a light emitting diode (LED) or organic electro luminescence (EL), instead of a DMD may be used. Alternatively, total reflective type mirrors may be used instead of specular reflective type first and second mirrors 38 and 39 of the embodiment.

An example where a laser light source is used as the light source 22 has been described in the embodiment, but the present disclosure is not limited thereto. A mercury lamp, an LED, and the like may be used as the light source 22. Further, the blue laser light source and the yellow phosphor have been used in the embodiment, but the present disclosure is not limited thereto. A green phosphor and a red phosphor may be used instead of the yellow phosphor. Furthermore, a green laser light source and a red laser light source may be used instead of the yellow phosphor.

In the technique of the present disclosure, the abovementioned various embodiments and various modification examples can also be appropriately combined. Further, it goes without saying that the present disclosure is not limited to the embodiments and can employ various configurations without departing from a gist.

The description contents and shown contents having been described above are the detailed description of portions according to the technique of the present disclosure, and are merely an example of the technique of the present disclosure. For example, the description of the configuration, functions, actions, and effects having been described above is the description of examples of the configuration, functions, actions, and effects of the portions according to the technique of the present disclosure. Accordingly, it goes without saying that unnecessary portions may be deleted or new elements may be added or replaced in the description contents and shown contents described above without departing from the scope of the technique of the present disclosure. Further, the description of common technical knowledge and the like, which allow the technique of the present disclosure to be embodied and do not need to be particularly described, is omitted in the description contents and shown contents, which have been described above, to avoid complication and to facilitate the understanding of portions according to the technique of the present disclosure.

All documents, patent applications, and technical standards disclosed in this specification are incorporated in this specification by reference such that the incorporation of each of the documents, the patent applications, and the technical standards by reference is specific and is as detailed as that in a case where the documents, the patent applications, and the technical standards are described individually.

What is claimed is:

1. A projection lens comprising:
   a lens that is made of a resin;
   a first holding frame that holds the lens; and
   a second holding frame that is not in contact with the lens and that holds the first holding frame,
   wherein a thermal expansion coefficient of the first holding frame is higher than a thermal expansion coefficient of the second holding frame,
   wherein the first holding frame includes a holding portion that holds the lens and a connecting portion that is connected to the second holding frame,
   wherein the holding portion includes a first extending portion that extends in a radial direction of the lens,
   wherein the first extending portion includes a second contact portion that is in contact with an incident-side surface of the lens,
   wherein a space is provided between the second contact portion and the second holding frame to allow elastic deformation, in the radial direction of the lens, of the second contact portion due to thermal expansion of the lens,
   wherein the thermal expansion coefficient of the first holding frame includes a first thermal expansion coefficient in a radial direction of the lens and a second thermal expansion coefficient in an axial direction of the lens, and
   the first thermal expansion coefficient is larger than the second thermal expansion coefficient.

2. The projection lens according to claim 1,
   wherein the first holding frame and the second holding frame are connected to each other through the connecting portion in a state where the first holding frame is disposed on an outside and the second holding frame is disposed on an inside in a radial direction of the lens.

3. The projection lens according to claim 1,
   wherein the holding portion includes, in addition to the first extending portion, a second extending portion that extends in a direction of an optical axis of the lens.

4. The projection lens according to claim 1,
   wherein the first extending portion includes a first contact portion that is in contact with an emission-side surface of the lens.

5. The projection lens according to claim 4,
   wherein a length of the second contact portion in the radial direction is longer than a length of the first contact portion in the radial direction.

6. The projection lens according to claim 3,
   wherein the second extending portion is in contact with an edge surface of the lens.

7. The projection lens according to claim 1,
   wherein the connecting portion includes a third extending portion that extends in a radial direction of the lens and a fourth extending portion that extends in a direction of an optical axis of the lens.

8. The projection lens according to claim 1,
   wherein the first holding frame includes a facing portion that faces a part of an outer edge portion of the lens, and
   a gap is provided between the facing portion and the part of the outer edge portion of the lens.

9. The projection lens according to claim 8,
wherein the outer edge portion of the lens includes a linear outer edge portion, which is a portion extending linearly, and includes an arcuate outer edge portion, which is a remaining portion, and
wherein the holding portion holds the arcuate outer edge portion and the gap is provided between the facing portion and the linear outer edge portion.

10. The projection lens according to claim 1,
wherein a thermal expansion coefficient of the lens is higher than the thermal expansion coefficient of the first holding frame.

11. The projection lens according to claim 1,
wherein a distal end of the first holding frame, which holds the lens, has a tapered shape.

12. The projection lens according to claim 1,
wherein the lens is an aspherical lens that includes an aspheric surface among lens surfaces.

13. The projection lens according to claim 1,
wherein the lens is an emission lens disposed closest to an emission side.

14. The projection lens according to claim 1,
wherein the first holding frame is made of a fiber-reinforced resin and the second holding frame is made of metal.

15. The projection lens according to claim 1,
wherein the projection lens is for transportation equipment.

16. A projection device comprising:
the projection lens according to claim 1; and
an image forming unit that forms an image to be projected on a screen through the projection lens.

* * * * *